US011293500B2

(12) United States Patent
Dulken et al.

(10) Patent No.: US 11,293,500 B2
(45) Date of Patent: Apr. 5, 2022

(54) INDIVIDUALLY PHASED PAWL DRIVE MECHANISM

(71) Applicant: Industry Nine LLC, Asheville, NC (US)

(72) Inventors: Michael Macfarland Dulken, Asheville, NC (US); Clint John Spiegel, Asheville, NC (US)

(73) Assignee: Industry Nine LLC, Asheville, NC (US)

( * ) Notice: Subject to any disclaimer, the term of this patent is extended or adjusted under 35 U.S.C. 154(b) by 0 days.

(21) Appl. No.: 16/252,028

(22) Filed: Jan. 18, 2019

(65) Prior Publication Data

US 2019/0219109 A1    Jul. 18, 2019

Related U.S. Application Data

(60) Provisional application No. 62/618,702, filed on Jan. 18, 2018.

(51) Int. Cl.
| F16D 41/24 | (2006.01) |
| B62M 9/10 | (2006.01) |
| B60B 27/02 | (2006.01) |
| B60B 27/00 | (2006.01) |
| F16D 41/30 | (2006.01) |

(52) U.S. Cl.
CPC .......... *F16D 41/24* (2013.01); *B60B 27/0026* (2013.01); *B60B 27/023* (2013.01); *B62M 9/10* (2013.01); *F16D 41/30* (2013.01); *B60Y 2200/13* (2013.01)

(58) Field of Classification Search
CPC ....... F16D 41/12; F16D 41/30; B60B 27/023; B60B 27/047
USPC .......................................... 192/64; 310/110.5
See application file for complete search history.

(56) References Cited

U.S. PATENT DOCUMENTS

| 5,964,332 A | 10/1999 | King |
| 6,202,813 B1 * | 3/2001 | Yahata ................. B60B 27/0005 192/46 |
| 6,419,272 B1 * | 7/2002 | Yamaguchi ......... B60R 22/1954 280/806 |
| 8,992,375 B2 | 3/2015 | Gobel et al. |

(Continued)

FOREIGN PATENT DOCUMENTS

EP    0777060 A1 * 6/1997 ............. F16D 41/30

*Primary Examiner* — Richard M Lorence
(74) *Attorney, Agent, or Firm* — William G. Heedy; The Van Winkle Law Firm

(57) ABSTRACT

An individually phased pawl drive mechanism includes a plurality of pawls each including a plurality of protrusions forming at least one slot between a corresponding pairing of the plurality of protrusions; a pawl carrier member sized and configured for receipt of the plurality of pawls; a drive ring carrier member including a plurality of radially displaced teeth; wherein rotation in one direction causes a first one of the plurality of radially displaced teeth to engage a first one of the plurality of pawls, the primary pawl; and wherein continued rotation is permitted if the drive force is sufficient to cause deflection of the pawl carrier member relative to the drive ring carrier member, thereby causing one or more subsequent ones of the plurality of secondary pawls each to be brought into engagement in succession with a corresponding one of the plurality of radially displaced teeth.

16 Claims, 4 Drawing Sheets

(56) References Cited

U.S. PATENT DOCUMENTS

2008/0083595 A1* 4/2008 Spiegel ................ F16D 41/30
    192/43.1
2010/0288593 A1* 11/2010 Chiesa ................ F16D 41/12
    192/46

* cited by examiner

INDIVIDUALLY PHASED PAWL DRIVE MECHANISM

RELATED APPLICATION

This application claims priority to and incorporates entirely by reference U.S. Provisional Patent Application Ser. No. 62/618,702 filed on Jan. 18, 2018.

FIELD OF THE INVENTION

This invention relates to pawl drive mechanisms and, more particularly, a configuration for a pawl drive mechanism for reducing the possibility of excessive loading on a single pawl, which is common in traditional multi-pawl drive mechanisms.

BACKGROUND OF THE INVENTION

For many years, the freewheel and the hub body of a bicycle drive mechanism have been integrated into a single unit commonly referred to as a freehub. In a pawl and ratchet freehub design, the amount of time required and, accordingly, the degree of pedal movement required, for pawl and ratchet freehub engagement can be extremely important, particularly when operating a mountain bike on steep incline or decline. A drive mechanism which provides for quick engagement reduces the loss of forward momentum and effectively increases pedal power during operation.

Of predominant concern with any multi-pawl drive mechanism is the amount of time required for the pawls to engage the drive ring. For example, a drive ring having sixty teeth would have a 6-degree engagement displacement with sixty positions available for pawl engagement in a 360-degree rotation. One design intended to improve the speed of engagement is disclosed in U.S. Patent Application Publication No. US 2008/0083595 to Spiegel et al., wherein a first set of pawls is placed out of phase with a second set of pawls such that the time period during which one must wait before engagement of the pawls with the drive ring is effectively reduced because one does not need to wait for the pawls to move along a complete length of one recess of the drive ring before seating therein. Consequently, the time required to engage the pawls is reduced by half and, in the above example with a sixty-tooth drive ring, thus provides for a reduced engagement displacement of three degrees. There are instances, however, wherein the slightest mechanical inaccuracy in the drive mechanism might cause one pawl to click in, but not the other two pawls from the common set of pawls, thereby resulting in a single pawl engagement. In such instances of single pawl engagement, the drive force is transferred entirely to the singularly engaged pawl, which results in undue stress on the bearing and, ultimately, premature bearing failure.

Therefore, with the above motivations taken into consideration, there exists a need for an individually phased pawl drive mechanism wherein each individual pawl is technically phased such that the possibility of excessive loading on a single pawl is reduced or eliminated in order to increase the lifespan of the drive mechanism.

SUMMARY OF THE INVENTION

In accordance with one form of the present invention, there is provided an individually phased pawl drive mechanism for a freewheel of a bicycle wheel hub, the individually phased pawl drive mechanism including a plurality of pawls each including a distal end and a proximal end; each of the plurality of pawls including a plurality of protrusions along the distal end thereof, the plurality of protrusions forming at least one slot between a corresponding pairing of the plurality of protrusions; a pawl carrier member including a plurality of circumferentially spaced nests each being sized and configured for receipt of the proximal end of a corresponding one of the plurality of pawls; a drive ring carrier member including a plurality of circumferentially spaced teeth being shaped and dimensioned for positioning within the at least one slot on each of the plurality of pawls; wherein a quantity (D) of the plurality of circumferentially spaced teeth is defined by the equation:

$$D=(P)(Y)+1$$

wherein P is the quantity of the plurality of pawls and Y is a multiplier; wherein rotation of the pawl carrier member is caused by a drive force; wherein rotation of the pawl carrier member in a first direction causes the plurality of pawls to collectively slide over the plurality of circumferentially spaced teeth on the inner facing surface of the drive ring carrier member and rotation of the pawl carrier member in a second direction causes a first one of the plurality of circumferentially spaced teeth to engage a first one of the plurality of pawls on the at least one slot of the corresponding one of the plurality of pawls; the first one of the plurality of pawls to be brought into engagement defining a primary pawl and a remainder of the plurality of pawls defining a plurality of secondary pawls; and wherein continued rotation of the pawl carrier member in the second direction is permitted if the drive force is sufficient to cause deflection of the pawl carrier member relative to the drive ring carrier member, thereby causing one or more subsequent ones of the plurality of secondary pawls each to be brought into engagement in succession with a corresponding one of the plurality of circumferentially spaced teeth.

In accordance with another form of the present invention, there is provided an individually phased pawl drive mechanism for a freewheel of a bicycle wheel hub, the individually phased pawl drive mechanism including a plurality of pawls each including a distal end and a proximal end; each of the plurality of pawls including a plurality of protrusions along the distal end thereof, the plurality of protrusions forming at least one slot between a corresponding pairing of the plurality of protrusions; a pawl carrier member including a plurality of circumferentially spaced nests each being sized and configured for receipt of the proximal end of a corresponding one of the plurality of pawls; a drive ring carrier member including a plurality of circumferentially spaced teeth; each of the plurality of circumferentially spaced teeth being shaped and dimensioned for positioning within the at least one slot on each of the plurality of pawls; wherein a quantity (D) of the plurality of circumferentially spaced teeth is defined by the equation:

$$D=(P)(Y)+1$$

wherein P is the quantity of the plurality of pawls and Y is a multiplier; wherein relative rotation of the pawl carrier member and the drive ring carrier member is caused by a drive force; wherein relative rotation of the pawl carrier member and the drive ring carrier member in a first direction causes the plurality of pawls to collectively slide over the plurality of circumferentially spaced teeth and relative rotation of the pawl carrier member and the drive ring carrier member in a second direction causes a first one of the plurality of pawls to be brought into engagement with the plurality of circumferentially spaced teeth; the first one of the plurality of pawls to be brought into engagement defining a primary pawl and a remainder of the plurality of pawls defining a plurality of secondary pawls; and wherein continued relative rotation of the pawl carrier member and the drive ring carrier member in the second direction is permitted if the drive force is sufficient to cause deflection of the pawl carrier member relative to the drive ring carrier member, thereby causing one or more subsequent ones of the plurality of secondary pawls each to be brought into engagement in succession with a corresponding one of the plurality of circumferentially spaced teeth.

In accordance with another form of the present invention, there is provided an individually phased pawl drive mechanism for a freewheel of a bicycle wheel hub, the individually phased pawl drive mechanism including a plurality of pawls each including a distal end and a proximal end; a pawl carrier member including a plurality of circumferentially spaced nests each being sized and configured for receipt of the proximal end of a corresponding one of the plurality of pawls; a drive ring carrier member including a plurality of circumferentially spaced teeth; each of the plurality of circumferentially spaced teeth being shaped and dimensioned for receipt therebetween of the distal end of one of the plurality of pawls; wherein relative rotation of the pawl carrier member and the drive ring carrier member is caused by a drive force; wherein relative rotation of the pawl carrier member and the drive ring carrier member in a first direction causes the plurality of pawls to collectively slide over the plurality of circumferentially spaced teeth of the drive ring carrier member; wherein relative rotation of the pawl carrier member and the drive ring carrier member in a second direction causes a first one of the plurality of pawls to brought into engagement with the plurality of circumferentially spaced teeth, the first one of the plurality of pawls to be brought into engagement defining a primary pawl and a remainder of the plurality of pawls defining a plurality of secondary pawls; and wherein continued relative rotation of the pawl carrier member and the drive ring carrier member in the second direction is permitted if the drive force is sufficient to cause deflection of the pawl carrier member relative to the drive ring carrier member, thereby causing one or more subsequent ones of the plurality of secondary pawls each to be brought into engagement with a corresponding one of the plurality of circumferentially spaced teeth.

BRIEF DESCRIPTION OF THE DRAWINGS

For a fuller understanding of the nature of the present invention, reference should be made to the following detailed description, taken in conjunction with the accompanying drawings in which.

DETAILED DESCRIPTION OF THE PREFERRED EMBODIMENTS

Referring to the several views of the drawings, the individually phased pawl drive mechanism of the present invention is shown and is generally indicated as 10. The individually phased pawl drive mechanism is configured for use in combination with a freewheel of a bicycle wheel hub. By intentionally having only one pawl per phase, significantly more phases can be achieved using an individually phased pawl drive mechanism than is currently available in the bicycle industry.

Figure 1:
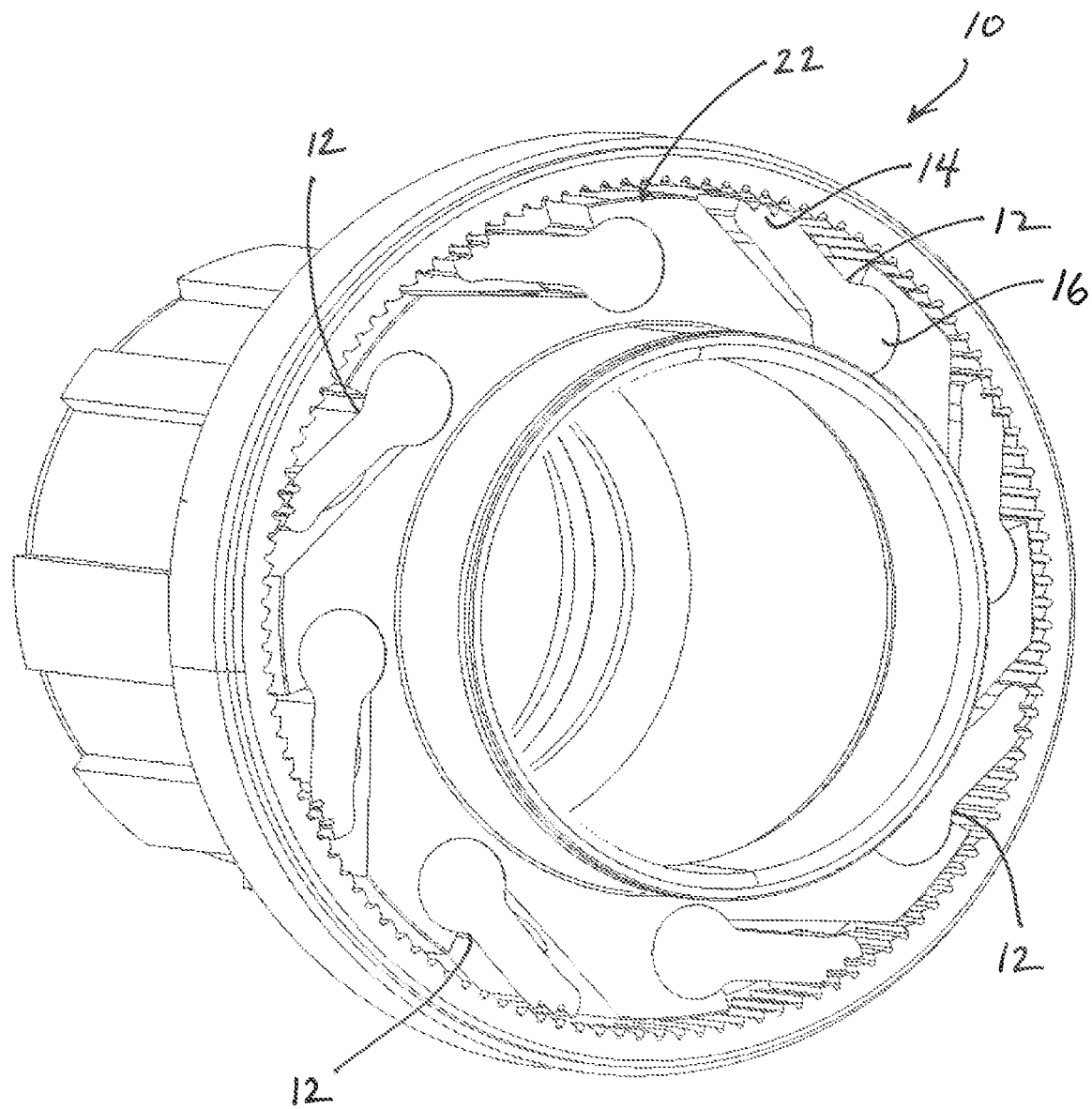
FIG. 1 is a perspective view of the individually phased pawl drive mechanism including a pawl carrier member, a plurality of pawls, and a drive ring carrier member.
Figure 2:
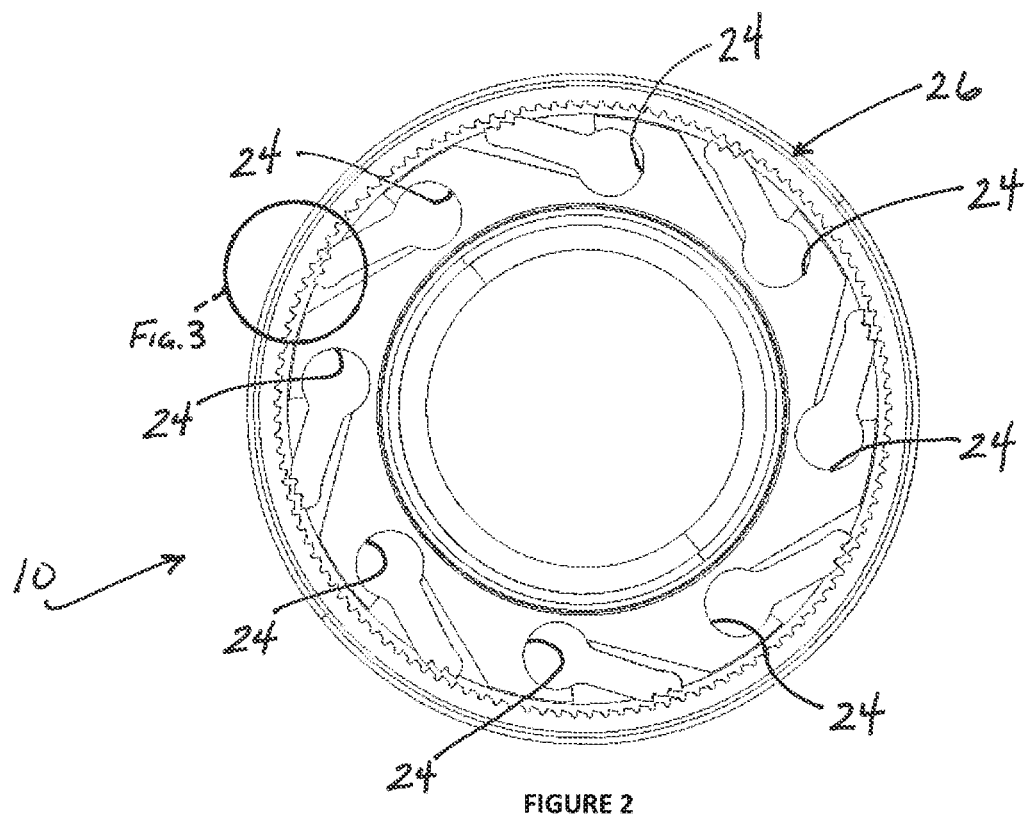
FIG. 2 is a side elevational view of the individually phased pawl drive mechanism including a pawl carrier member, a plurality of pawls, and a drive ring carrier member.
Figure 3:
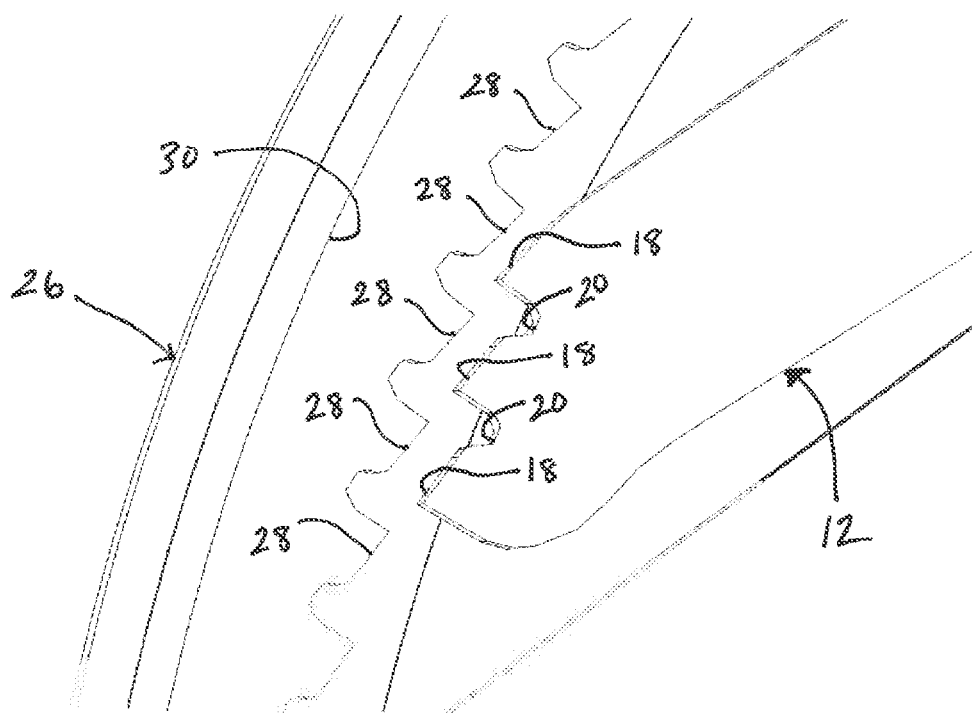
FIG. 3 is an isolated view taken from FIG. 2 illustrating a plurality of protrusions of one pawl and a plurality of circumferentially spaced teeth of the drive ring carrier member.

Referring initially to FIG. 13, a plurality of pawls 12 each include a distal end 14 and a proximal end 16. In one embodiment of the individually phased pawl drive mechanism 10, there are eight pawls 12, as shown in FIGS. 1 and 2. Referring specifically to FIG. 3, a plurality of protrusions 18 along the distal end 14 of each pawl 12 form one or more slots 20 therebetween. A pawl carrier member 22 includes a plurality of circumferentially spaced nests 24 each being sized and configured for receipt of the proximal end 16 of a corresponding one of the plurality of pawls 12, wherein limited rotation of each pawl 12 is permitted within the corresponding circumferentially spaced nest 24. A drive ring carrier member 26 includes a plurality of circumferentially spaced teeth 28 disposed on an inner facing surface 30 of the drive ring carrier member 26. It is noted that the relative positioning of the drive ring carrier member 26 and pawl carrier member 22 can be inverted, wherein the drive ring carrier member 26 is located centrally of the pawl carrier member 22 and the circumferentially spaced teeth 28 are positioned on the outer facing surface of the drive ring carrier member 22. Each of the plurality of circumferentially spaced teeth 28 is shaped and dimensioned for positioning within the slots 20 on each of the plurality of pawls 12 such that power is transmitted therebetween in a unilateral direction during operation of the bicycle.

It should be noted that while an eight-pawl drive mechanism 10 is primarily disclosed herein, the number of pawls 12 may be varied without departing from the spirit of the invention. Moreover, while not shown, it is noted that a spring or other biasing member, such as a magnet, is associated with each pawl 12 for holding the pawl 12 in place and biasing the respective pawl in the direction of the drive ring carrier member 26, as is well known in the art.

Engagement time is defined as a measurement of the time taken for the pawls 12 to come into interaction with the drive ring carrier member 26 and begin powering the bicycle. Accordingly, the greater the number of pawls 12 and circumferentially spaced teeth 28, the more points of engagement there are. The fewer degrees of engagement, the better the engagement time is for the operator of the bicycle. The individually phased pawl drive mechanism 10 includes a quantity (D) of the plurality of circumferentially spaced teeth 28 defined by the equation:

$$D=(P)(Y)+1$$

wherein P is the quantity of the plurality of pawls and Y is a multiplier. In a preferred embodiment, the multiplier, Y, is an integer. Rotation of the pawl carrier member 22 is caused by a drive force created by a rider or other drive force creation mechanism. Rotation of the pawl carrier member 22 in a first direction causes the plurality of pawls 12 to collectively slide over the plurality of circumferentially spaced teeth 28 on the inner facing surface of the drive ring carrier member 26. The additional circumferentially spaced tooth 28, as provided for in the above-referenced equation, results in equally spaced teeth 28 such that rotation of the pawl carrier member 22 in a second direction causes a first one of the plurality of circumferentially spaced teeth 28 to engage a first one of the plurality of pawls 12 on one of the slots 20 of the corresponding one of the plurality of pawls 12. It is noted that in certain configurations of drive ring carrier members 26 and pawl carrier members 22, the drive force is applied the drive ring carrier member 26. Such configurations do not depart from the spirit of this invention. Accordingly, it is noted that the above-referenced embodiment constitutes one embodiment of the invention and, in all cases, it is the relative rotation of the pawl carrier member 22 and the drive ring carrier member 26 in a first or second direction which operates the individually phased pawl drive mechanism 10. Moreover, in one embodiment, each of the plurality of pawls 12 may include only a single protrusion 18 being sized and configured for engagement between first and second circumferentially spaced teeth 28.

The first one of the plurality of pawls 12 to be brought into engagement defines a primary pawl and a remainder of the plurality of pawls 12 defines a plurality of secondary pawls. Continued rotation of the pawl carrier member 22 in the second direction is permitted if the drive force is sufficient to cause deflection of the pawl carrier member 22 relative to the drive ring carrier member 26, thereby causing one or more subsequent ones of the plurality of secondary pawls 12 each to be brought into engagement in succession with a corresponding one of the plurality of circumferentially spaced teeth 28. This allows a quantity of pawls 12 to share the load as is needed depending on the drive force the individually phased pawl drive mechanism encounters during operation of the bicycle. Accordingly, a single pawl engagement initially occurs by design and, if the drive force is not sufficient to cause deflection of the pawl carrier member 22, one or more secondary pawls 12 will also not engage. This will allow for a calculated amount of load to be applied to the drive system and stabilize while achieving minimal degrees of engagement. Generally, the amount of drive force required for pawl carrier member 22 deflection (flexing) to occur, and therefore for multi-pawl engagement to occur, is most likely to transpire in a low gear, uphill situation.

Figure 4:
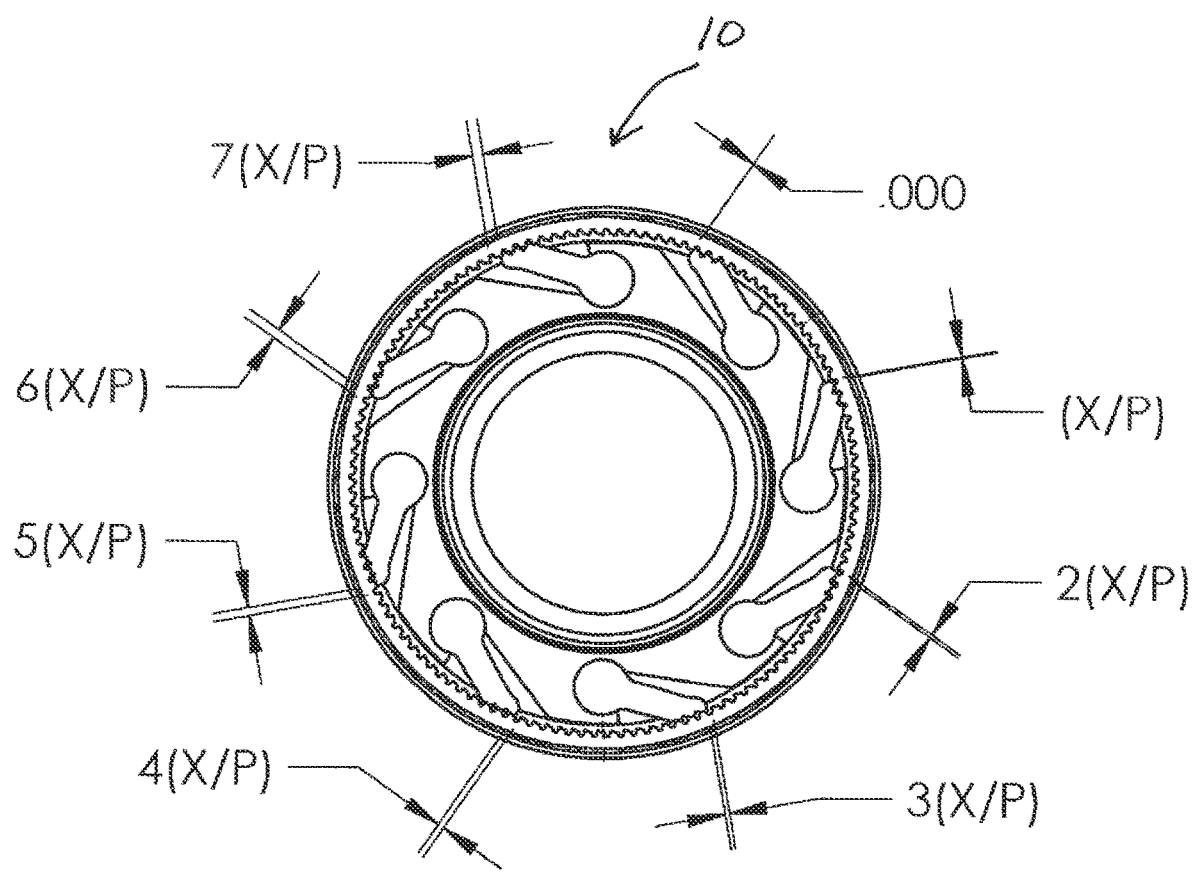
FIG. 4 is a side elevational view of the individually phased pawl drive mechanism in accordance with one embodiment.

Referring now to FIG. 4, the circumferential distance (R) each secondary pawl 12 must travel (as the pawl carrier member 22 is deflected) for engagement with a corresponding one of the plurality of circumferentially spaced teeth 28 is defined by the equation:

$$R=(N)(X/P)$$

wherein P is the quantity of the plurality of pawls, X is the distance between each of the plurality of circumferentially spaced teeth, and N is a value equal to the number of the order in succession of engagement a particular individual secondary pawl 12 is relative to the primary pawl, which is engaged and therefore has an R value of 0.000.

Figure 5:
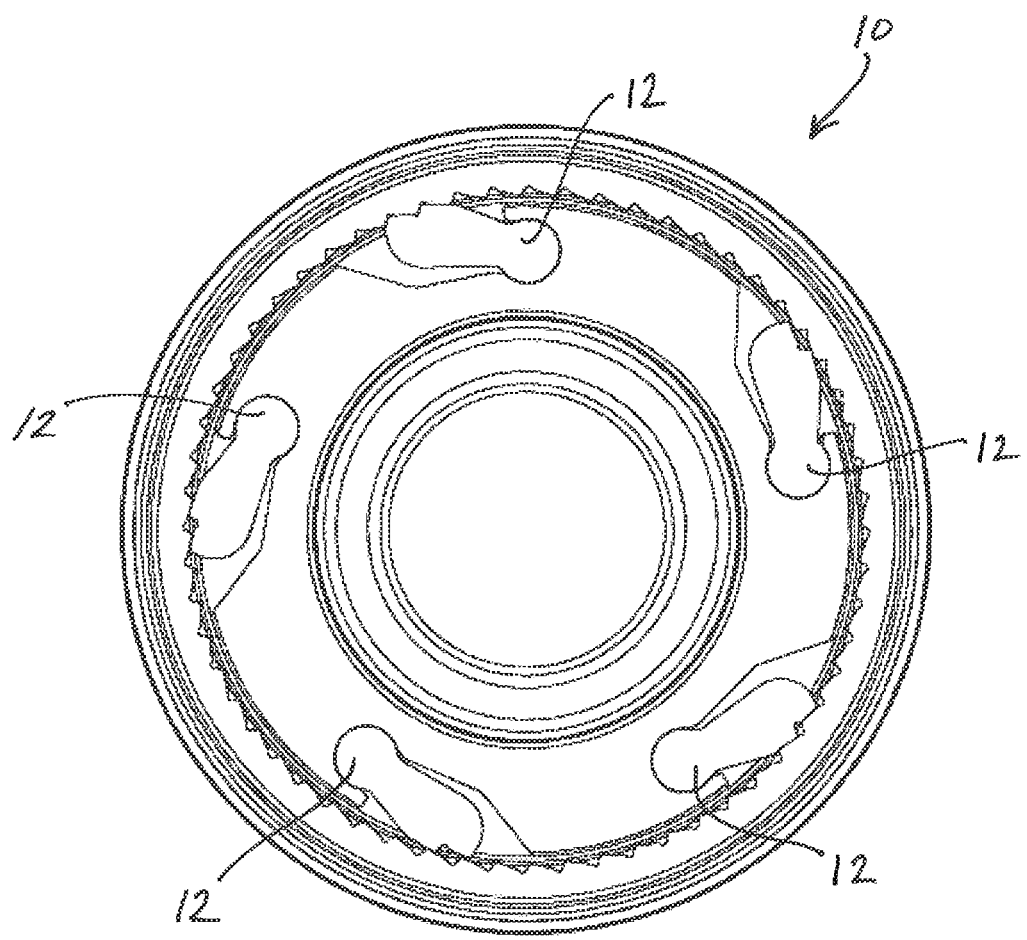
FIG. 5 is a side elevational view of the individually phased pawl drive mechanism in accordance with one embodiment Like reference numerals refer to like parts throughout the several views of the drawings.

This drive configuration can also function by offsetting the pawls a calculated degree of rotation from the preceding pawl if natural phasing is not desired. Referring to FIG. 5, another embodiment of the drive mechanism 10 is illustrated wherein the subsequent pawls 12 do not engage in sequential order relative to their respective placement on the pawl carrier member 22, which is the case for the embodiment illustrated in FIG. 4.

Using the individually phased pawl drive mechanism 10 depicted in FIGS. 1 and 2 as an example, there is a quantity P of eight (8) pawls 12 on the free hub member 22 and a multiplier Y of fifteen (15) is used, meaning that there is a quantity D of one hundred twenty-one (121) circumferentially spaced teeth. There are nine hundred-sixty-eight (968) points of engagement and, therefore, approximately 0.3719 degrees of engagement. During operation of the bicycle, a primary pawl is brought into engagement within 0.3719 degrees of rotation and, if the drive force is sufficient to cause deflection of the pawl carrier member 22 relative to the drive ring carrier member 26, one or more of the secondary pawls will be brought into engagement in succession with the drive ring carrier member 26.

While the present invention has been shown and described in accordance with several preferred and practical embodiments, it is recognized that departures from the instant disclosure are contemplated within the spirit and scope of the present invention.

What is claimed is:

1. An individually phased pawl drive mechanism for a freewheel of a bicycle wheel hub, the individually phased pawl drive mechanism comprising:
   a plurality of pawls each including a distal end and a proximal end;
   each of the plurality of pawls including a plurality of protrusions along the distal end thereof, the plurality of protrusions forming at least one slot between a corresponding pairing of the plurality of protrusions;
   a pawl carrier member including a plurality of circumferentially spaced nests each being sized and configured for receipt of the proximal end of a corresponding one of the plurality of pawls;
   a drive ring carrier member including a plurality of circumferentially spaced teeth disposed on an inner facing surface of the drive ring carrier member;
   each of the plurality of circumferentially spaced teeth being shaped and dimensioned for positioning within the at least one slot on each of the plurality of pawls;
   wherein a quantity (D) of the plurality of circumferentially spaced teeth is defined by the equation:

$$D=(P)(Y)+1$$

wherein P is the quantity of the plurality of pawls and Y is a multiplier;
   wherein rotation of the pawl carrier member is caused by a drive force;
   wherein rotation of the pawl carrier member in a first direction causes the plurality of pawls to collectively slide over the plurality of circumferentially spaced teeth on the inner facing surface of the drive ring carrier member and the drive ring carrier member freewheels with respect to the pawl carrier member; and
   wherein rotation of the pawl carrier member in a second direction causes a first one of the plurality of circumferentially spaced teeth to engage a first one of the plurality of pawls on the at least one slot of the corresponding one of the plurality of pawls;
   the first one of the plurality of pawls to be brought into engagement defining a primary pawl and a remainder of the plurality of pawls defining a plurality of secondary pawls; and
   wherein continued rotation of the pawl carrier member in the second direction is permitted if the drive force is sufficient to cause deflection of the pawl carrier member relative to the drive ring carrier member, thereby causing one or more subsequent ones of the plurality of secondary pawls each to be brought into engagement in succession with a corresponding one of the plurality of circumferentially spaced teeth and the drive ring carrier member then rotates with the pawl carrier member.

2. The individually phased pawl drive mechanism as recited in claim 1 wherein Y is an integer.

3. The individually phased pawl drive mechanism as recited in claim 1 wherein the plurality of circumferentially spaced teeth of the drive ring carrier member are each equally displaced along the inner facing surface of the drive ring carrier member.

4. The individually phased pawl drive mechanism as recited in claim 3 wherein a circumferential distance (R) each subsequent one of the plurality of secondary pawls must be deflected for engagement with a corresponding one of the plurality of circumferentially spaced teeth is defined by the equation:

$$R=(N)(X/P)$$

wherein N is a value equal to the number in the order of succession of engagement a particular subsequent one of the plurality of secondary pawls is relative to the primary pawl and X is a value equal to the distance a first subsequent one of the plurality of secondary pawls must travel to be brought into engagement with a corresponding one of the plurality of circumferentially spaced teeth.

5. The individually phased pawl drive mechanism as recited in claim 1 wherein the plurality of pawls comprises eight pawls.

6. The individually phased pawl drive mechanism as recited in claim 1 wherein the plurality of pawls comprises six pawls.

7. The individually phased pawl drive mechanism as recited in claim 1 wherein the at least one slot on each of the plurality of pawls comprises a first slot and a second slot.

8. An individually phased pawl drive mechanism for a freewheel of a bicycle wheel hub, the individually phased pawl drive mechanism comprising:
a plurality of pawls each including a distal end and a proximal end;
each of the plurality of pawls including a plurality of protrusions along the distal end thereof, the plurality of protrusions forming at least one slot between a corresponding pairing of the plurality of protrusions;
a pawl carrier member including a plurality of circumferentially spaced nests each being sized and configured for receipt of the proximal end of a corresponding one of the plurality of pawls;
a drive ring carrier member including a plurality of circumferentially spaced teeth;
each of the plurality of circumferentially spaced teeth being shaped and dimensioned for positioning within the at least one slot on each of the plurality of pawls;
wherein a quantity (D) of the plurality of circumferentially spaced teeth is defined by the equation:

$$D=(P)(Y)+1$$

wherein P is the quantity of the plurality of pawls and Y is a multiplier;
wherein relative rotation of the pawl carrier member and the drive ring carrier member is caused by a drive force;
wherein relative rotation of the pawl carrier member and the drive ring carrier member in a first direction causes the plurality of pawls to collectively slide over the plurality of circumferentially spaced teeth of the drive ring carrier member and the drive ring carrier member freewheels with respect to the pawl carrier member; and
wherein relative rotation of the pawl carrier member and the drive ring carrier member in a second direction causes a first one of the plurality of pawls to be brought into engagement with the plurality of circumferentially spaced teeth;
the first one of the plurality of pawls to be brought into engagement defining a primary pawl and a remainder of the plurality of pawls defining a plurality of secondary pawls; and
wherein continued relative rotation of the pawl carrier member and the drive ring carrier member in the second direction is permitted if the drive force is sufficient to cause deflection of the pawl carrier member relative to the drive ring carrier member, thereby causing one or more subsequent ones of the plurality of secondary pawls each to be brought into engagement in succession with a corresponding one of the plurality of circumferentially spaced teeth and the drive ring carrier member then rotates with the pawl carrier member.

9. The individually phased pawl drive mechanism as recited in claim 8 wherein Y is an integer.

10. The individually phased pawl drive mechanism as recited in claim 8 wherein the plurality of circumferentially spaced teeth of the drive ring carrier member are each equally displaced.

11. The individually phased pawl drive mechanism as recited in claim 8 wherein a circumferential distance (R) each subsequent one of the plurality of secondary pawls must be deflected for engagement with a corresponding one of the plurality of circumferentially spaced teeth is defined by the equation:

$$R=(N)(X/P)$$

wherein N is a value equal to the number in the order of succession of engagement a particular subsequent one of the plurality of secondary pawls is relative to the primary pawl and X is a value equal to the distance a first subsequent one of the plurality of secondary pawls must travel to be brought into engagement with a corresponding one of the plurality of circumferentially spaced teeth.

12. The individually phased pawl drive mechanism as recited in claim 8 wherein the plurality of pawls comprises eight pawls.

13. The individually phased pawl drive mechanism as recited in claim 8 wherein the plurality of pawls comprises six pawls.

14. An individually phased pawl drive mechanism for a freewheel of a bicycle wheel hub, the individually phased pawl drive mechanism comprising:
a plurality of pawls each including a distal end and a proximal end;
a pawl carrier member including a plurality of circumferentially spaced nests each being sized and configured for receipt of the proximal end of a corresponding one of the plurality of pawls;
a drive ring carrier member including a plurality of circumferentially spaced teeth;
each of the plurality of circumferentially spaced teeth being shaped and dimensioned for receipt therebetween of the distal end of one of the plurality of pawls;

wherein relative rotation of the pawl carrier member and the drive ring carrier member is caused by a drive force;

wherein relative rotation of the pawl carrier member and the drive ring carrier member in a first direction causes the plurality of pawls to collectively slide over the plurality of circumferentially spaced teeth of the drive ring carrier member and the drive ring carrier member freewheels with respect to the pawl carrier member; and wherein relative rotation of the pawl carrier member and the drive ring carrier member in a second direction causes a first one of the plurality of pawls to brought into engagement with the plurality of circumferentially spaced teeth, the first one of the plurality of pawls to be brought into engagement defining a primary pawl and a remainder of the plurality of pawls defining a plurality of secondary pawls;

wherein continued relative rotation of the pawl carrier member and the drive ring carrier member in the second direction is permitted if the drive force is sufficient to cause deflection of the pawl carrier member relative to the drive ring carrier member, thereby causing one or more subsequent ones of the plurality of secondary pawls each to be brought into engagement with a corresponding one of the plurality of circumferentially spaced teeth and the drive ring carrier member then rotates with the pawl carrier member; and wherein a circumferential distance (R) each subsequent one of the plurality of secondary pawls must be deflected for engagement with a corresponding one of the plurality of circumferentially spaced teeth is defined by the equation:

$$R=(N)(X/P)$$

wherein P is the quantity of the plurality of pawls, N is a value equal to the number in the order of succession of engagement a particular subsequent one of the plurality of secondary pawls is relative to the primary pawl and X is a value equal to the distance a first subsequent one of the plurality of secondary pawls must travel to be brought into engagement with a corresponding one of the plurality of circumferentially spaced teeth.

15. The individually phased pawl drive mechanism as recited in claim 14 wherein the plurality of pawls comprises eight pawls.

16. The individually phased pawl drive mechanism as recited in claim 14 wherein the plurality of pawls comprises six pawls.

* * * * *